US012804609B2

(12) United States Patent
Orcutt et al.

(10) Patent No.: US 12,804,609 B2
(45) **Date of Patent: *Nov. 17, 2026**

(54) WIRELESS COMMUNICATION SYSTEMS FOR DYNAMICALLY CONNECTING TO RADIO ACCESS NETWORK RESOURCES OF MULTIPLE SERVICE PROVIDERS

(71) Applicant: Boost SubscriberCo L.L.C., Englewood, CO (US)

(72) Inventors: Jennings Maxwell Orcutt, Denver, CO (US); Christopher William Krasny Ergen, Littleton, CO (US); Owen William Christens-Barry, Castle Rock, CO (US)

(73) Assignee: Boost SubscriberCo L.L.C., Englewood, CO (US)

( * ) Notice: Subject to any disclaimer, the term of this patent is extended or adjusted under 35 U.S.C. 154(b) by 236 days.

This patent is subject to a terminal disclaimer.

(21) Appl. No.: 18/073,324

(22) Filed: Dec. 1, 2022

(65) Prior Publication Data

US 2024/0188043 A1 Jun. 6, 2024

(51) Int. Cl.
*H04W 72/02* (2009.01)
*H04W 72/54* (2023.01)
*H04W 76/30* (2018.01)

(52) U.S. Cl.
CPC ........... *H04W 72/02* (2013.01); *H04W 72/54* (2023.01); *H04W 76/30* (2018.02)

(58) Field of Classification Search
CPC .... H04L 5/0028; H04L 5/0044; H04W 76/15; H04W 72/02; H04W 72/54; H04W 76/30; H04W 28/0846; G06F 9/50; G06Q 30/0605; G06Q 10/0631
USPC .................................................. 370/329–330
See application file for complete search history.

(56) References Cited

U.S. PATENT DOCUMENTS

| | | | | |
|---|---|---|---|---|
| 6,728,266 | B1 | 4/2004 | Sabry et al. | |
| 2013/0023274 | A1* | 1/2013 | Meredith .............. | H04W 48/18 455/450 |
| 2013/0138812 | A1* | 5/2013 | Assuncao ................. | G06F 9/50 709/226 |
| 2013/0322401 | A1* | 12/2013 | Visuri ................... | H04W 88/06 370/331 |

(Continued)

FOREIGN PATENT DOCUMENTS

| | | | | |
|---|---|---|---|---|
| CN | 102104911 A * | 6/2011 | ............ | H04W 28/08 |
| CN | 201110052495 A * | 6/2011 | | |

(Continued)

*Primary Examiner* — Candal Elpenord
(74) *Attorney, Agent, or Firm* — Lowenstein Sandler LLP

(57) ABSTRACT

A network node configured to operate in a wireless communication system includes: memory, at least one transceiver, and at least one processor, coupled to the memory and the transceiver. The at least one processor is configured to obtain one or more first parameters of a plurality of radio access network (RAN) resources, the plurality of RAN resources being associated with at least two different service providers, select at least one first RAN resource among the plurality of RAN resources based on the one or more first parameters, assign a user equipment (UE) to the selected at least one first RAN resource, and transmit, to the UE, a first instruction configured to instruct the UE to connect to the at least one first RAN resource.

14 Claims, 7 Drawing Sheets

700

(56) References Cited

U.S. PATENT DOCUMENTS

| | | | | |
|---|---|---|---|---|
| 2014/0013320 | A1 * | 1/2014 | LaManna | G06F 8/61 717/177 |
| 2014/0133320 | A1 | 5/2014 | Stark et al. | |
| 2014/0269284 | A1 * | 9/2014 | Amanna, III | H04L 5/0037 370/230.1 |
| 2015/0049642 | A1 * | 2/2015 | Eng | H04L 5/0069 370/254 |
| 2016/0157295 | A1 * | 6/2016 | Qin | H04W 24/02 370/329 |
| 2021/0241294 | A1 * | 8/2021 | Pacynski | G06Q 30/0605 |
| 2021/0409998 | A1 | 12/2021 | Kwok et al. | |
| 2023/0209317 | A1 | 6/2023 | Liu et al. | |
| 2024/0340618 | A1 | 10/2024 | Sugaya et al. | |

FOREIGN PATENT DOCUMENTS

| | | | | | |
|---|---|---|---|---|---|
| CN | 111724269 | A | | 9/2020 | |
| CN | 113256123 | A | * | 8/2021 | G06Q 10/0631 |
| CN | 202110584146 | A | * | 8/2021 | G06Q 10/0631 |
| KR | 20187025372 | A | * | 10/2018 | |
| WO | 2018027591 | A1 | | 2/2018 | |
| WO | 2020081016 | W | * | 10/2020 | H04L 5/0044 |
| WO | WO-2020192670 | A1 | * | 10/2020 | H04L 5/0044 |

* cited by examiner

300

500

700

WIRELESS COMMUNICATION SYSTEMS FOR DYNAMICALLY CONNECTING TO RADIO ACCESS NETWORK RESOURCES OF MULTIPLE SERVICE PROVIDERS

TECHNICAL FIELD

The present disclosure relates to a wireless communication system, and more particularly, to a method of selecting at least one radio access network (RAN) resource among a plurality of RAN resources based on one or more parameters of the plurality of RAN resources.

BACKGROUND

A conventional wireless communication system allows a user equipment (UE) to be assigned to a radio access network (RAN) resource of a service provider. For example, if a user of the UE subscribes to the service provider, the UE can transmit and receive data through the RAN resource associated with the service provider.

SUMMARY

If a UE is located in an area covered by a plurality of RAN resources associated with two different service providers, dynamically selecting a RAN resource among the plurality of RAN resources can be challenging when each RAN resource has one or more different parameters including at least one of an available bandwidth, a bandwidth usage, a radio indicator, a received signal strength indicator (RSSI), an available capacity, coverage, current time, or price per a data size, and dynamically selecting a RAN resource according to the one or more parameters can be challenging. This is because the one or more parameters can change over time and service providers associated with the plurality of RAN resources can request different prices for using the RAN resources. Configuring the UE to dynamically connect to a RAN resource among a plurality of RAN resources can be challenging and may require expensive processing and/or bandwidth.

The present disclosure is directed to a wireless communication system that can support dynamically selecting a RAN resource among RAN resources available from a plurality of service providers, and instructing a UE to connect to the selected RAN resource.

The present disclosure is also directed to a wireless communication system that can support splitting large data entities (e.g., a file, a message, an image or a video, etc.) and transmitting the split data entities over RAN resources associated with two or more service providers and stitching them back together at the receiving point. For example, a UE can download one or more parts of the original file from computers/sources that have already downloaded the original file, crowd-source the bandwidth needed for the file transfer, and reduce the time needed to download large files by utilizing different terrestrial or satellite RAN/s available.

According to one aspect of the subject matter described in this application, a network node configured to operate in a wireless communication system can include memory, at least one transceiver, and at least one processor coupled to the memory and the transceiver. The at least one processor can be configured to obtain one or more first parameters of a plurality of radio access network (RAN) resources, the plurality of RAN resources being associated with at least two different service providers, select at least one first RAN resource among the plurality of RAN resources based on the one or more first parameters, assign a user equipment (UE) to the selected at least one first RAN resource, and transmit, to the UE, a first instruction configured to instruct the UE to connect to the at least one first RAN resource.

Implementations according to this aspect can include one or more of the following features. For example, the one or more first parameters can include at least one of an available bandwidth, a bandwidth usage, a radio indicator, a received signal strength indicator (RSSI), an available capacity, coverage, current time, or price per a data size.

In some examples, selecting the at least one first RAN resource can include selecting the at least one first RAN resource based on the bandwidth usage of each of the plurality of RAN resources. In some examples, obtaining the one or more first parameters can include receiving, from the at least two different service providers, information indicative of at least one of the one or more first parameters.

In some implementations, the processor can be further configured to transmit to the UE, based on determining that a release condition is satisfied, a second instruction configured to instruct the UE to disconnect from the at least one first RAN resource, obtain one or more second parameters of the plurality of RAN resources, select at least one second RAN resource among the plurality of RAN resources based on the one or more second parameters, assign the UE to the selected at least one second RAN resource, and transmit, to the UE, a third instruction configured to instruct the UE to connect to the at least one second RAN resource. In some examples, the release condition can include a first condition that the UE is assigned to the at least one first RAN resource over a predetermined time. In some examples, the release condition can include a second condition that the UE is determined to be outside of a coverage area of the at least one first RAN resource.

In some implementations, selecting the at least one first RAN resource can include generating a pricing recommendation based on the one or more first parameters, transmitting the generated pricing recommendation to the at least two different service providers, and selecting the at least one first RAN resource based on one or more responses received from the at least two different service providers. In some examples, generating the pricing recommendation can include generating the pricing recommendation based on the one or more first parameters and output from a machine-learning network.

In some implementations, obtaining the one or more first parameters can include measuring information indicative of at least one of the one or more first parameters at the at least two different service providers.

According to another aspect of the subject matter described in this application, a method for communication in a wireless communication system can include obtaining one or more first parameters of a plurality of radio access network (RAN) resources, the plurality of RAN resources being associated with at least two different service providers, selecting at least one first RAN resource among the plurality of RAN resources based on the one or more first parameters, assigning a user equipment (UE) to the selected at least one first RAN resource, and transmitting, to the UE, a first instruction configured to instruct the UE to connect to the at least one first RAN resource.

Implementations according to this aspect can include one or more of the following features. For example, the one or more first parameters can include at least one of an available bandwidth, a bandwidth usage, a radio indicator, a received signal strength indicator (RSSI), an available capacity, coverage, current time, or price per a data size.

In some examples, selecting the at least one first RAN resource can include selecting the at least one first RAN resource based on the bandwidth usage of each of the plurality of RAN resources. In some examples, obtaining the one or more first parameters can include receiving, from the at least two different service providers, at least one of the one or more first parameters.

In some implementations, the method can further include transmitting to the UE, based on determining that a release condition is satisfied, a second instruction configured to instruct the UE to disconnect from the at least one first RAN resource, obtaining one or more second parameters of the plurality of RAN resources, selecting at least one second RAN resource among the plurality of RAN resources based on the one or more second parameters, assigning the UE to the selected at least one second RAN resource, and transmitting, to the UE, a third instruction configured to instruct the UE to connect to the at least one second RAN resource.

In some examples, the release condition can include a first condition that the UE is assigned to the at least one first RAN resource over a predetermined time. In some examples, the release condition can include a second condition that the UE is determined to be outside of a coverage area of the at least one first RAN resource.

In some implementations, selecting the at least one first RAN resource can include generating a pricing recommendation based on the one or more first parameters, transmitting the generated pricing recommendation to the at least two different service providers, and selecting the at least one first RAN resource based on one or more responses received from the at least two different service providers. In some examples, generating the pricing recommendation can include generating the pricing recommendation based on the one or more first parameters and output from a machine-learning network.

In some implementations, obtaining the one or more first parameters can include receiving, from the at least two different service providers, information indicative of the one or more first parameters. For example, an internet access (i) is asymmetrical, (ii) supports greater download speeds than upload speeds, (iii) limits the bandwidth of each download, and (iv) enforces bandwidth caps and periods where systems are not accessible. In some scenarios, this may cause inefficiency when many devices try to obtain the same set of files from a single source because the source must always be online and have massive outbound bandwidth. The aforementioned methods can address such inefficiency by decentralizing the distribution, leveraging the ability of multiple RANs to network information peer-to-peer.

According to another aspect of the subject matter described in this application, a network node configured to operate in a wireless communication system can include memory, at least one transceiver, and at least one processor coupled to the memory and the transceiver. The at least one processor can be configured to receive one or more first packets associated with a first radio access network (RAN) resource and one or more second packets associated with a second RAN resource, generate a combined information packet by coalescing the one or more first packets and the one or more second packets, and transmit the combined information packet to a destination identified in at least one of (i) the one or more first packets or (ii) the one or more second packets.

Implementations according to this aspect can include one or more of the following features. For example, the at least one processor can be configured to receive, from a user equipment (UE), configuration information regarding connection to a RAN resource among a plurality of RAN network resources, obtain one or more first parameters of the plurality of RAN resources, the plurality of RAN resources being associated with at least two different service providers, select, based on the one or more first parameters, the first RAN resource and the second RAN resource among the plurality of RAN resources, and transmit, to the UE, information identifying the first RAN resource and the second RAN resource.

In some examples, the at least one processor can be configured to determine whether the one or more first packets and the one or more second packets are to be requested by the UE based on the received configuration information. In some examples, the one or more first packets and the one or more second packets can be output of a machine-learning network that uses the received configuration information.

In some examples, the one or more first parameters can include at least one of an available bandwidth, a bandwidth usage, a radio indicator, a received signal strength indicator (RSSI), an available capacity, coverage, current time, or price per unit data size. In some examples, selecting the first and second RAN resources can include selecting the first and second RAN resources based on the bandwidth usage of each of the plurality of RAN resources.

In some implementations, obtaining the one or more first parameters can include receiving, from the at least two different service providers, information indicative of at least one of the one or more first parameters. In some implementations, a transmission speed of the first RAN resource can be greater than a transmission speed of the second RAN resource.

In some examples, the one or more first packets and the one or more second packets can be determined based on (i) a size of data including the one or more first and second packets and (ii) the current time. In some implementations, selecting the first and second RAN resources can include generating a pricing recommendation based on the one or more first parameters, transmitting the generated pricing recommendation to the at least two different service providers, and selecting the first and second RAN resources based on one or more responses received from the at least two different service providers.

In some examples, generating the pricing recommendation can include generating the pricing recommendation based on the one or more first parameters and output from a machine-learning network. In some implementations, obtaining the one or more first parameters can include measuring information indicative of at least one of the one or more first parameters at the at least two different service providers.

According to another aspect of the subject matter described in this application, a method for communication in a wireless communication system can include receiving one or more first packets associated with a first radio access network (RAN) resource and one or more second packets associated with a second RAN resource, generating a combined information packet by coalescing the one or more first packets and the one or more second packets, and transmitting the combined information packet to a destination identified in at least one of (i) the one or more first packets or (ii) the one or more second packets.

Implementations according to this aspect can include one or more of the following features. For example, the method can further include receiving, from a user equipment (UE), configuration information regarding connection to a RAN resource among a plurality of RAN network resources, obtaining one or more first parameters of the plurality of RAN resources, the plurality of RAN resources being associated with at least two different service providers, selecting, based on the one or more first parameters, the first RAN resource and the second RAN resource among the plurality of RAN resources, and transmitting, to the UE, information identifying the first RAN resource and the second RAN resource.

In some examples, the method can further include determining whether the one or more first packets and the one or more second packets are to be requested by the UE based on the received configuration information. In some examples, the one or more first packets and the one or more second packets can be output of a machine-learning network that uses the received configuration information. In some examples, the one or more first parameters can include at least one of an available bandwidth, a bandwidth usage, a radio indicator, a received signal strength indicator (RSSI), an available capacity, coverage, current time, or price per unit data size.

In some implementations, selecting the first and second RAN resources can include selecting the first and second RAN resources based on the bandwidth usage of each of the plurality of RAN resources. In some implementations, a transmission speed of the first RAN resource can be greater than a transmission speed of the second RAN resource. In some implementations, the one or more first packets and the one or more second packets can be determined based on (i) a size of data including the one or more first and second packets and (ii) the current time.

Dynamically connecting to RAN resources of multiple service providers can have following advantages.

First, dynamic selection of RAN resources of multiple service providers allows for optimal connections by intelligent routing through of one of multiple RAN resources of the multiple service providers.

Second, dynamic connection to RAN resources of multiple service providers allows sharing of bandwidth among multiple RAN resources of multiple service providers to efficient transmit large data entities.

Third, dynamic connection to RAN resources of multiple service providers provides for potentially improved user experience compared to a conventional network system that uses a single dedicated network.

DETAILED DESCRIPTION

Figure 1:
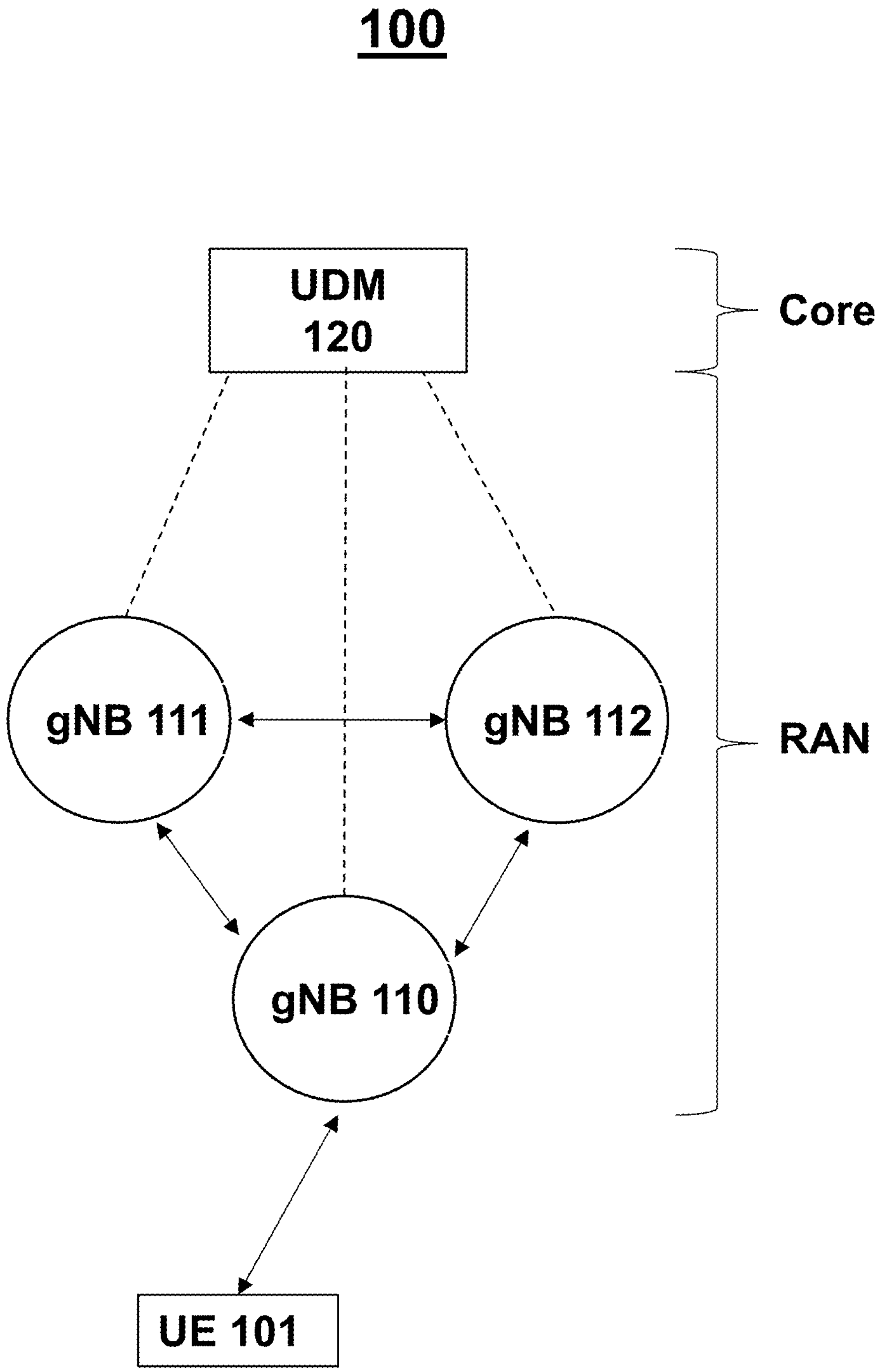
FIG. 1 is a diagram illustrating an example of a wireless communication system.

Wireless communication systems that utilize RAN resources of a dedicated service provider (also referred to as a network e.g., a home network or a roaming network) can sometimes be plagued by issues affecting the particular network. For example, a wireless device that always connects to RAN resources of a particular home network when not in a roaming mode, and to a particular roaming network when in a roaming mode at a particular geographic location, is fully dependent on those particular networks for satisfactory communications. Yet, when a particular network in a given location is performing in a sub-optimal fashion (e.g., has low bandwidth, low RSSI etc.), RAN resources from other networks (e.g., as provided by RAN resources from other service providers) available at the given location may allow for better communications. The technology described herein allows for evaluating operational parameters of RAN resources of multiple service providers to select resources from a particular service provider. For example, if at a given time, RAN resources from a first service provider has lower available bandwidth as compared to RAN resources from a second provider, a UE may be instructed to connect to RAN resources of the first service provider at that time. At another time, if the situation is reversed—i.e., the available bandwidth from the first service provider becomes higher than that from the second service provider—the UE may be instructed to connect to the RAN resources of the first service provider. Such dynamic selection of RAN resources from one or multiple service providers can provide for a flexible communication system that is capable of leveraging the most optimal resources available to the UE at a given time. This in turn can allow for faster communications as compared to systems that are always connected to a particular network at a given location.

In some implementations, the technology described herein allows for leveraging multiple networks for transmission of a unit of data such as a message or another file that can be split into multiple portions. For example, in some situations, where multiple networks are available to an UE to connect to, transmitting an entire data entity (e.g., a message with attachments) over the network with maximum available bandwidth can still be less efficient as compared to splitting the data entity into multiple parts and transmitting over multiple networks in parallel. In the current example, the message can be transmitted over one network (i.e., the RAN resources of one service provider) while the attachments can be transmitted over another network (i.e., the RAN resources of another service provider) to achieve faster transmission as compared to transmitting both the message and the attachments over a single network. As such, by allowing for such "divide and conquer" approach, the technology described herein can provide for efficient communication systems that enhance user experience as compared to systems that transmit data over a single network at a time. For example, the burden on the network can be distributed among the downloaders, rather than concentrating at a central distribution hub or cluster. As long as all the pieces of the data entity are available, peers (downloaders and uploaders) can come and go: no one peer needs to have all the chunks or to even stay connected to the RAN/s in order for distribution to continue among the other peers.

FIG. 1 is a diagram illustrating an example of a wireless communication system 100. Referring to FIG. 1, the wireless communication system 100 can include a user equipment (UE) 101, a RAN, and a core network (e.g., a $5^{th}$ generation core network or satellite network).

The UE 101 can include a terminal, Mobile Equipment (ME), or Mobile Station (MS). The UE 101 can be a portable device such as a notebook computer, mobile phone, Personal Digital Assistant (PDA), smart phone, or a multimedia device, or a fixed device such as a Personal Computer (PC) or vehicle-mounted device. The UE 101 can include a communication module configured to transmit and receive a signal, a processor configured to control the communication module, and a memory configured to store information.

The RAN can include at least one RAN node. The RAN node can include at least one of gNodeBs (gNBs) 110, 111, and 112 (e.g., a base station supporting 5G New Radio or satellite). In some implementations, the RAN can be implemented to use a satellite access or a terrestrial access.

The core network can include a unified data management (UDM) module 120. The core network can further include an access and mobility management function (AMF), a user plane function (UPF), and a session management function (SMF). The AMF can host the functions, such as non-access stratum (NAS) security, idle state mobility handling, etc. The AMF can be an entity including the functions of a conventional MME. The UPF can host the functions, such as mobility anchoring, protocol data unit (PDU) handling. The UPF can be an entity including the functions of the conventional S-GW. The SMF can host the functions, such as UE IP address allocation and PDU session control.

The UDM module 120 can be configured to manage data for access authorization, user registration, and data network profiles. Subscriber data can be provided to the SMF, which allocates IP addresses and manages user sessions on the network. In some implementations, the UDM module can send and store data. The AMF can receive user information sent through the network and forward the information to the SMF, which uses it to determine what session manager would be best assigned to the user. For example, the SMF can be a gateway from the user plane to the control plane of the network.

Each of the gNBs 110, 111 and 112 can be a network node in charge of transmission/reception of wireless signals with the UE 101. The gNB can support functions for radio resource management (e.g., radio bearer control and radio admission control), connection mobility control, the dynamic allocation (i.e., scheduling) of resources to a UE in the uplink/downlink, Internet protocol (IP) header compression, the encryption and integrity protection of a user data stream, the selection of an AMF module upon attachment of a UE, user plane data routing to an UPF(s), control plane information routing to an AMF module, connection setup and release, the scheduling and transmission of a paging message (generated from an AMF module), the scheduling and transmission of system broadcast information, a measurement and measurement report configuration for mobility and scheduling, transport level packet marking in the uplink, session management, the support of network slicing, QoS flow management and mapping to a data radio bearer, the support of a UE that is in an inactive mode, the distribution function of an NAS message, an NAS node selection function, radio access network sharing, and dual connectivity. In some implementations, the gNBs 110, 111, and 112 can pertain to at least two different wireless communication providers.

Figure 2:
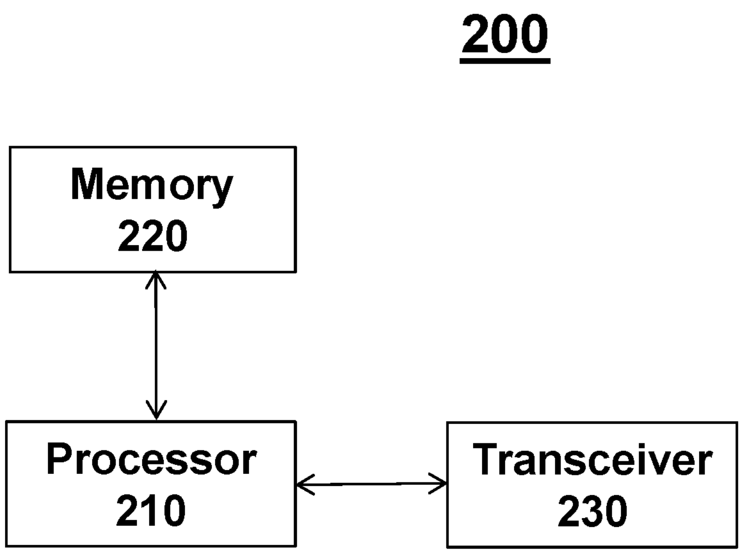
FIG. 2 is a diagram illustrating an example of a computing device.

FIG. 2 is a diagram illustrating an example of a computing device 200 that is employed to execute implementations of the present disclosure. The computing device 200 is intended to represent various forms of digital computers, such as laptops, desktops, workstations, personal digital assistants, servers, blade servers, mainframes, and other appropriate computers. The computing device 200 is intended to represent various forms of mobile devices, such as personal digital assistants, cellular telephones, smartphones, AR devices, and other similar computing devices. The components shown here, their connections and relationships, and their functions, are meant to be examples only, and are not meant to be limiting. The computing device 200 can form at least a portion of the application installation environment described above.

Referring to FIG. 2, the computing environment 200 can include a processor 210, a memory 220 and a transceiver 230.

In some implementations, the processor 210 can perform various operations described below with respect to FIGS. 3-7. For example, the processor 210 can be implemented in the core network and perform obtaining one or more first parameters of a plurality of RAN resources, selecting at least one first RAN resource among the plurality of RAN resources based on the one or more first parameters, assigning the UE 101 to the selected at least one first RAN resource, and transmitting, to the UE, a first instruction configured to instruct the UE to connect to the at least one first RAN resource. By way of further example, the processor can perform receiving one or more first packets associated with a first RAN resource and one or more second packets associated with a second RAN resource, generating a combined information packet by coalescing the one or more first packets and the one or more second packets, and transmitting the combined information packet to a destination identified in at least one of (i) the one or more first packets or (ii) the one or more second packets.

The transceiver 230 can be connected to the processor 210 and configured to transmit and receive radio signals. The processor 210 can include application-specific integrated circuits (ASICs), other chipsets, logic circuits and/or data processing devices. The memory 220 can include read-only memory (ROM), random access memory (RAM), flash memory, memory cards, storage media and/or other storage devices. The transceiver 230 can include a baseband circuit for processing a radio signal. When implemented in software, the aforementioned scheme may be implemented as a module (process, function, etc.) for performing the aforementioned function. The module can be stored in the memory and executed by the processor. The memory 220 may be placed inside or outside of the processor 210 and connected to the processor 210 using a variety of well-known means.

The computing device 200 can be implemented in a number of different forms, as described above with respect to FIG. 2. For example, it may be implemented in the UE 101 or the core network (e.g., the UDM module 120) described with respect to FIG. 1.

The computing device 200 can be implemented in the wireless communication system 100 described above with respect to FIG. 1. For example, the various components included in the wireless communication system 100 can include the computing device 200.

Figure 3:
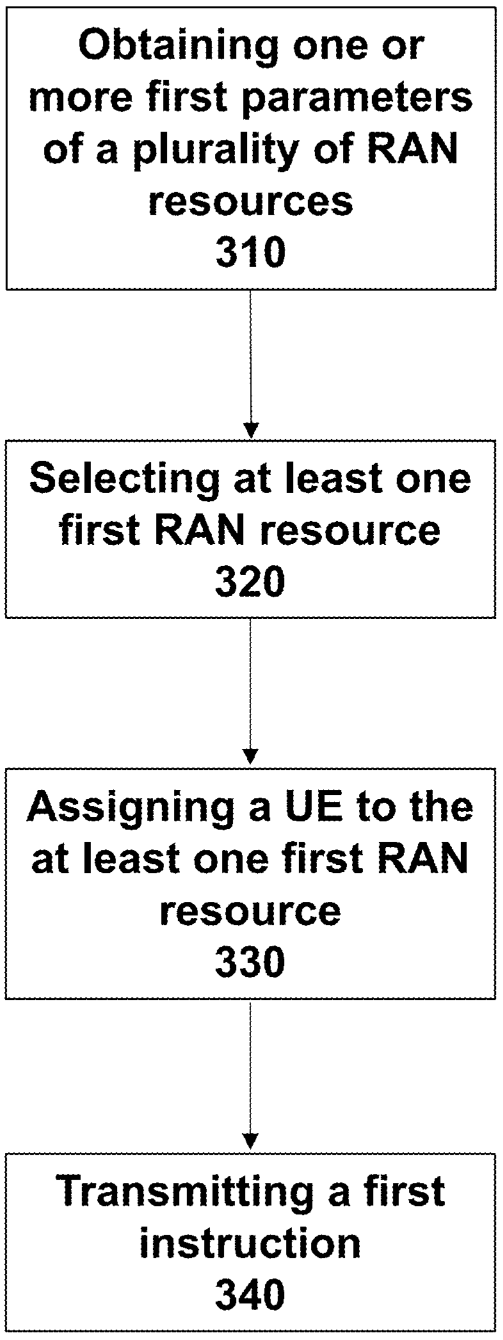
FIG. 3 is a flowchart showing an example of a RAN connection procedure.

FIG. 3 is a flowchart illustrating an example of a RAN connection procedure 300. In the following flowchart, at least one step may be omitted or a new step may be added.

In step 310, the core network (e.g., the UDM module 120) can obtain one or more first parameters of a plurality of radio access network (RAN) resources of at least two different service providers. For example, the one or more first parameters can include at least one of an available bandwidth, a bandwidth usage, a radio indicator, a received signal strength indicator (RSSI), an available capacity, coverage, current time, a physical distance between a UE 101 and the RAN, or price per a data size of the plurality of RAN resources of the at least two different service providers.

The plurality of RAN resources can be associated with at least two different service providers. In some implementations, the at least two different service providers can provide different network services. For example, a first service provider can provide a network service that supports transmitting data and voice both at once, but a network service provided by a second service provider does not provide this feature while using Frequency division multiple access (DMA) and Time division multiple access (TDMA). In some examples, first and second service providers can be differentiated by a technology type. For example, a first service provider can use a transmitter and a second servicer provider can use a satellite, or a first service provider can use the third generation (3G) telecommunications technology and a second service can use the fifth generation (5G) telecommunications technology. In some implementations, first and second service providers can be differentiated by a public land mobile network (PLMN-ID) and frequency type, frequency license holder, or mobile country codes.

In some implementations, the at least two different service providers can provide information indicative of at least one of the one or more first parameters to the core network. For example, a first service provider, among the at least two different service providers, can provide, to the core network, an available capacity of a first RAN resource associated with the first service provider.

In some implementations, the core network can measure information indicative of at least one of the one or more first parameters at the at least two different service providers. For example, the core network can measure an available bandwidth of each RAN resource by transmitting a signal to each RAN resource and measuring a response time from each RAN resource. By way of further example, the core can measure an available bandwidth of each RAN resource using a packet error loss rate, jitter, or an end-to-end venue latency.

In step 320, the core network can select at least one first RAN resource among the plurality of RAN resources of the at least two different service providers based on the one or more first parameters obtained in step 310. For example, the core network can select the at least on first RAN resource based on the bandwidth usage of each of the plurality of RAN resources. By way of further example, if a first bandwidth usage of a first RAN resource is less than a bandwidth usage of each of remaining RAN resources, the core network can select the first RAN resource.

In some implementations, the core network can generate a pricing recommendation based on the one or more first parameters obtained in step 310, transmit the generated pricing recommendation to the at least two different service providers, and select the at least one first RAN resource based on one or more responses received from the at least two different service providers. The pricing recommendation can be generated based on the one or more first parameters and can be output from a machine-learning network. The pricing recommendation generation will be described in detail below with respect to FIG. 4.

In step 330, the core network can assign the UE 101 to the selected at least one first RAN resource. In step 340, the core network can transmit, to the UE, a first instruction configured to instruct the UE to connect to the at least one first RAN resource. In some implementations, after the UE is connected to the at least one first RAN resource according to the first instruction, the UE can utilize the at least one first RAN resource for transmitting and receiving data.

Figure 4:
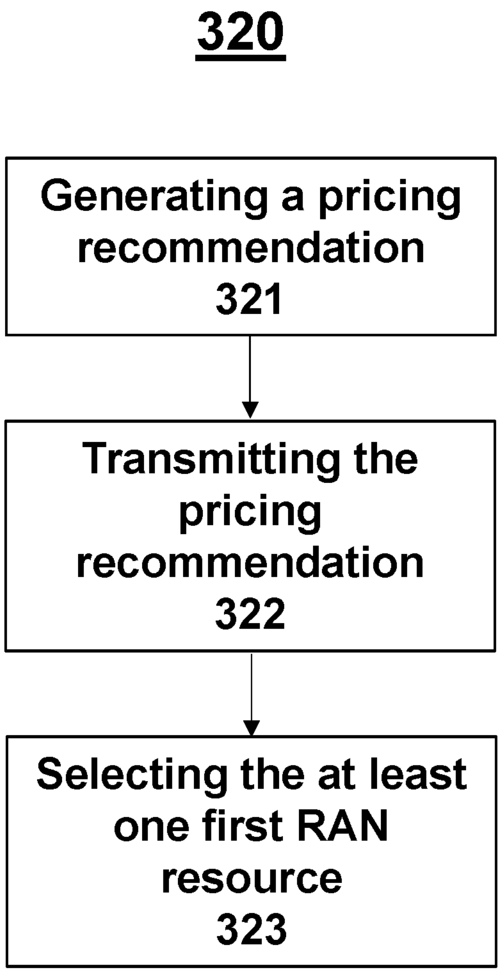
FIG. 4 is a flowchart showing an example of a RAN selection procedure.

FIG. 4 is flowchart showing a detailed example of a RAN selection procedure 320 described above with respect to FIG. 3. In the following flowchart, at least one step may be omitted or a new step may be added.

In step 321, the core network can generate a pricing recommendation based on the one or more first parameters of the plurality of RAN resources obtained in step 310. For example, the core network can analyze the obtained available bandwidth, bandwidth usage, radio indicator, RSSI, available capacity, coverage, current time, or price per the data size of the plurality of RAN resources associated with the at least two different service providers to generate a recommended price per unit of data for using a RAN resource of the plurality RAN resources. For example, the recommended price per unit of data can be $10 per 1 GB.

In some implementations, the price can vary based on a location where data is to be consumed through a RAN resource. For example, the location can be where the UE is located, and, if the location is covered by only one RAN resource among the plurality of RAN resources, a price may be higher than a price for another location that is covered by more than one RAN resources.

In some implementations, a machine-learning network implemented in the core network can generate a pricing recommendation based on the one or more first parameters. For example, the machine-learning network can analyze the obtained available bandwidth, bandwidth usage, radio indicator, RSSI, available capacity, coverage, current time, or price per the data size against historical data stored in the machine-learning network and generate a pricing recommendation.

In step 322, the core network can transmit the pricing recommendation generated in step 321 to the at least two different service providers each associated with a RAN resource. In response to the transmitted pricing recommendation, the at least two different service providers can either accept the price per data recommended in the transmitted pricing recommendation or make a counter offer and transmit the acceptance or the counter offer to the core network. In response to the received acceptance or counter offer, the core network can, in step 323, select at least one first RAN resource among the plurality of RAN resources of the at least two different service providers. For example, the core network can receive one or more responses received from one or more service providers, determine a lowest price per unit of data offered among prices per unit of data included in the one or more responses, and select a RAN resource associated with the lowest price per data.

Figure 5:
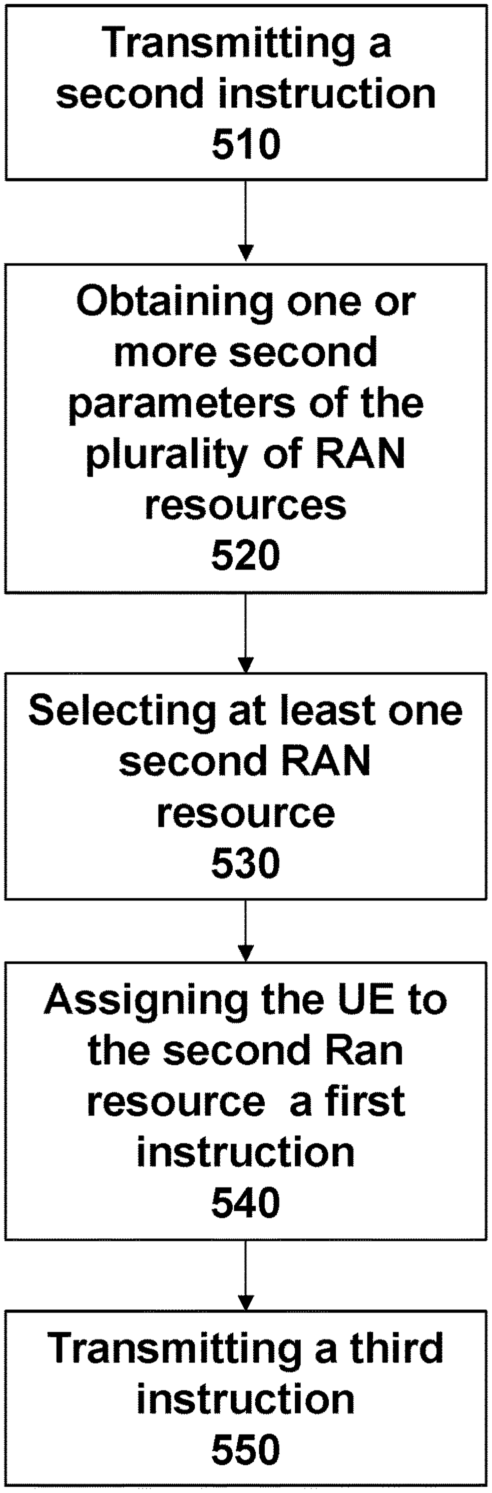
FIG. 5 is a flowchart showing a RAN reselection procedure.

FIG. 5 is flowchart showing a RAN reselection procedure 500. In the following flowchart, at least one step may be omitted or a new step may be added.

A connection between the UE 101 and the at least one first RAN resource, which was configured according to the first instruction from step 340, may be lost. For example, if the UE leaves the coverage area of the first RAN resource, the connection between the UE and the first RAN resource may be lost and reconnection with another RAN resource may be necessary. The RAN reselection procedure 500 can be performed to reconnect the UE 101 to another RAN resource.

In step 510, the core network can transmit, to the UE, a second instruction configured to instruct the UE to disconnect from the at least one first RAN resource, based on determining that a release condition is satisfied. In some implementations, the release condition can include a first condition that the UE is assigned to the at least one first RAN resource over a predetermined time and a second condition that the UE is determined to be outside of a coverage area of the at least one first RAN resource. For example, if the core network determines at least one of (i) the UE being assigned to the at least one first RAN resource over a predetermined time or (ii) the UE being determined to be outside of the coverage area of the at least one first RAN resource, the core network can transmit a second instruction to the UE instructing the UE to disconnect from the at least one first RAN resource.

In step 520), the UE can obtain one or more second parameters of the plurality of RAN resources. For example, the one or more second parameters can include at least one of an available bandwidth, a bandwidth usage, a radio indicator, a received signal strength indicator (RSSI), an available capacity, coverage, current time, or price per a data size of the plurality of RAN resources as described above with respect to step 310. In some implementations, the second parameters can be different from the one or more first parameters of step 310.

In step 530), the core network can select at least one second RAN resource among the plurality of RAN resources based on the one or more second parameters obtained in step 520. For example, the core network can select the at least on second RAN resource based on the bandwidth usage of each of the plurality of RAN resources. By way of further example, if a second bandwidth usage of a second RAN resource is less than a bandwidth usage of each of remaining RAN resources, the core network can select the second RAN resource.

In some implementations, the core network can perform the step 320 to use the pricing recommendation for selecting the second RAN resource.

In step 540, the core network can assign the UE 101 to the selected at least one second RAN resource. In step 550), the core network can transmit, to the UE, a third instruction configured to instruct the UE 101 to connect to the at least one second RAN resource. In some implementations, after the UE is connected to the at least one second RAN resource according to the third instruction, the UE can utilize the at least one second RAN resource for transmitting and receiving data.

Figure 6:
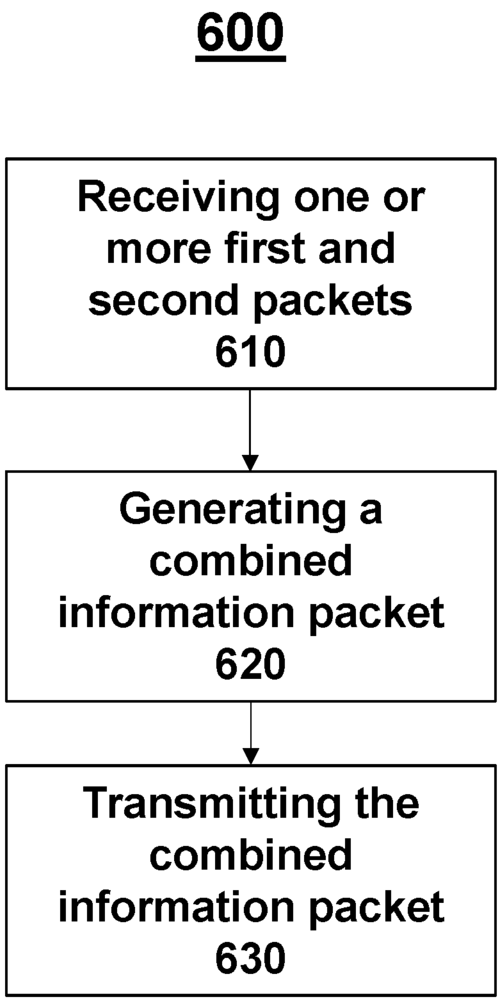
FIG. 6 is a flowchart showing a combined information packet transmission procedure.

FIG. 6 is flowchart showing a combined information packet transmission procedure 600. In the following flowchart, at least one step may be omitted or a new step may be added. In some implementations, the core network can combine packets from different RAN resources of multiple service providers and transmit the combined packets to a destination identified in the packets.

In step 610, the core network can receive one or more first packets associated with a first RAN resource and one or more second packets associated with a second RAN resource. In some implementations, the UE 101 can request that the core network transmit the one or more first packets and the one or more second packets. For example, the UE 101 can request a media file including video packets and audio packets where the first packets include the video packets and the second packets include the audio packets.

In some implementations, the first and second RAN resources can use multiple carriage methods including 5G, Advanced Television Systems Committee (ATSC) 3.0, Data Base Server (DBS), L-Band, C-Band, Ku-Band, Ka-Band, Multichannel Video and Data Distribution Service (MVDDS), and Narrowband Internet of Things (NB-IOT).

In some implementations, a transmission speed of the first and second RAN resources can be different from each other and the core network can determine one or more first packets to be transmitted over the first RAN resource and one or more second packets to be transmitted over the second RAN resource. For example, the core network can determine a first half of the media file to be transmitted over the first RAN resource using 5G and a second half of the media file to be transmitted over the second RAN resource using ATSC 3.0.

In step 620, the core network can generate a combined information packet by coalescing the one or more first packets and the one or more second packets. For example, each of the first packets and the second packets can include a header file that includes information regarding each of the first and second packets. The core network can, in some implementations, parse each header file to coalesce the one or more first packets and the one or more second packets to generate a combined information packet. The information of the header file can include a location, a hierarchy, a network location, and where the packets are to be distributed. A distributed hash table (DHT) can be implemented to provide a lookup service similar to a hash table using key-value pairs. The main advantage of a DHT is that nodes can be added or removed with minimum work around re-distributing keys. Keys are unique identifiers which map to particular values, which can be addresses, documents, or arbitrary data. Responsibility for maintaining the mapping from keys to values is distributed among the nodes, in such a way that a change in the set of participants causes a minimal amount of disruption. This can enable a DHT to scale to extremely large numbers of nodes and to handle continual node arrivals, departures, and failures. In some implementations, the combined information packet can be a media file, a message including a video and text, etc., but it is not limited thereto.

In step 630, the core network can transmit the combined information packet to a destination identified in at least one of (i) the one or more first packets or (ii) the one or more second packets. In some implementations, the destination can be the UE 101.

Figure 7:
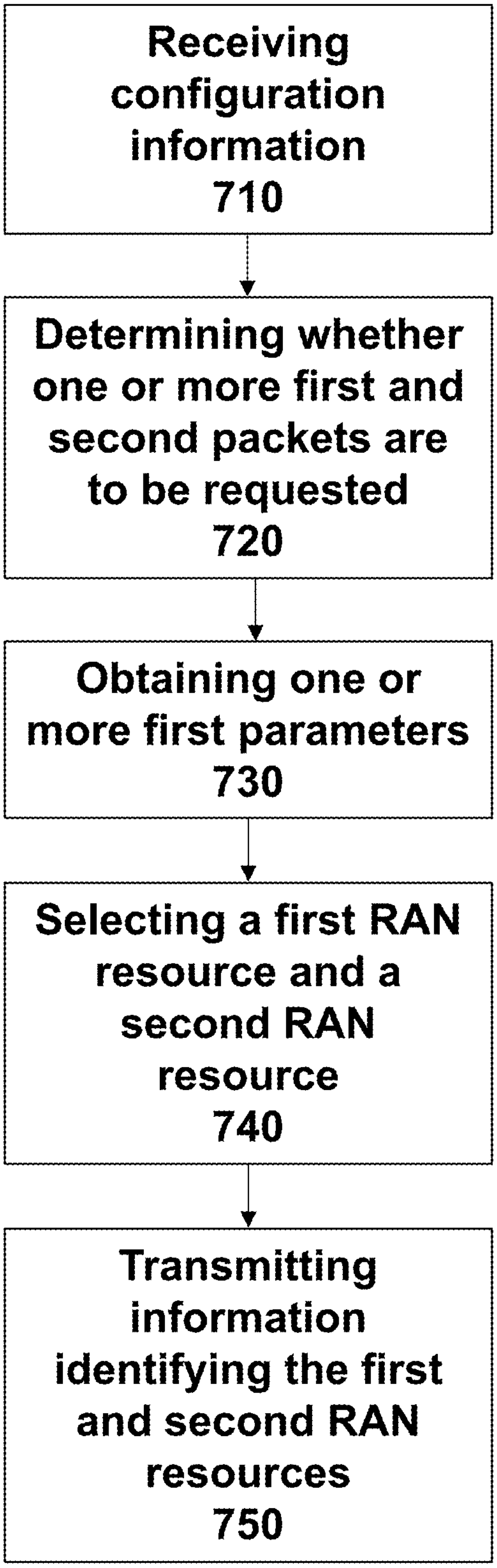
FIG. 7 is a flowchart showing a RAN resource selection procedure for transmitting the combined information packet of FIG. 6.

FIG. 7 is flowchart showing a flowchart showing a RAN resource selection procedure 700 performed to transmit the combined information packets described above with respect to FIG. 6. In the following flowchart, at least one step may be omitted or a new step may be added.

In step 710, the core network can receive, from the UE 101, configuration information regarding connection to a RAN resource among a plurality of RAN network resources of at least two different service providers. For example, the UE 101 can request that the core network, establish a connection with a RAN resource. In some implementations, the connection with the RAN resource allows the UE 101 to transmit or receive data.

In step 720, the core network can determine whether the one or more first packets and the one or more second packets described above with respect to FIG. 6 are to be requested by the UE 101 based on the configuration information received in step 710. For example, the core network can determine, when the UE 101 requests connection with a RAN resource, whether a media file including first and second packets is to be requested.

In some implementations, the core network can operate a machine-learning network, which uses the configuration information received in step 710, to output the one or more first packets and the one or more second packets. For example, an anticipated data session for outputting the one or more first packets and the one or more second packets can be a software or firmware update, or specific user behaviors around content consumption or time of day the UE typically sees the most data use.

In some implementations, the core network can determine the one or more first and second packets based on a size of data including the one or more first and second packets, an urgency indicator, and the current time. For example, if a size of a media file is greater than a threshold size, the core network can determine to split the media file into half and transmit the first half over the first RAN resource and the second half over the second RAN resource where a transmission speed of the first RAN resource is greater than a transmission speed of the second RAN resource such that the core network can prioritize the first half over the second half for the UE to display the first half of the media file before the second half of the media file. Further, using different RAN resources by splitting one media file can have advantages by transmitting the second half of the media file over the second RAN resource that is slower but costs less than using the first RAN resource.

In step 730, the core network can obtain one or more first parameters of a plurality of RAN resources. For example, the one or more first parameters can include at least one of an available bandwidth, a bandwidth usage, a radio indicator, a received signal strength indicator (RSSI), an available capacity, coverage, current time, or price per a data size of the plurality of RAN resources. The plurality of RAN resources can be associated with at least two different service providers.

In some implementations, the at least two different service providers can provide information indicative of at least one of the one or more first parameters to the core network.

In some implementations, the core network can measure information indicative of at least one of the one or more first parameters at the at least two different service providers. For example, the core network can measure an available bandwidth of each RAN resource by transmitting a signal to each RAN resource and measure response time from each RAN resource.

In step 740, the core network can select a first RAN resource and a second RAN resource among the plurality of RAN resources based on the one or more first parameters obtained in step 730. For example, the core network can select the first RAN resource and the second RAN resource based on the bandwidth usage of each of the plurality of RAN resources, where a bandwidth usage of each of the first and second RAN resources is lower than a bandwidth usage of each of remaining RAN resources.

In some implementations, the core network can determine the one or more first packets to be transmitted over a first RAN resource and the one or more second packets to be transmitted over a second RAN resource where a transmission speed of the first RAN resource is greater than a transmission speed of the second RAN resource. For example, the first RAN resource can transmit data 10 GB/s while the second RAN resource can transmit data at 5 GB/s.

In some implementations, the core network can perform a procedure similar to the procedure 320 described with respect to FIG. 4 to select the first and second RAN resources. For example, the core network can perform (i) step 321 to generate a pricing recommendation based on the one or more first parameters, (ii) step 322 to transmit the pricing recommendation generated in step 321 to the at least two different service providers, and (iii) step 323 to select the first and second RAN resources based on one or more responses received from the at least two different service providers.

In step 750, the core network can transmit information identifying the first RAN resource and the second RAN resource to the UE. For example, the information can identify that the first RAN resource can be utilized for the one or more first packets and the second RAN resource can be utilized for the one or more second packets.

In some implementations, the first and second RAN resources can have different transmission speeds.

In some implementations, each of the first and second RAN resources can be associated with a respective of the two different service providers.

Although a few implementations have been described in detail above, other modifications may be made without departing from the scope of the inventive concepts described herein, and, accordingly, other implementations are within the scope of the following claims.

What is claimed is:

1. A network node configured to operate in a wireless communication system, the network node comprising:
- memory;
- at least one transceiver; and
- at least one processor, coupled to the memory and the at least one transceiver, the at least one processor configured to:
  - obtain one or more first network condition parameters of a plurality of radio access network (RAN) resources, the plurality of RAN resources being associated with at least two different service providers, wherein the one or more first network condition parameters include at least one of an available bandwidth, a bandwidth usage, a radio indicator, a received signal strength indicator (RSSI), an available capacity, coverage, current time, or price per unit data, and wherein the one or more first network condition parameters are obtained from measurements of the plurality of RAN resources of the at least two different service providers;
  - select at least one first RAN resource among the plurality of RAN resources based on the one or more first network condition parameters;
  - assign a user equipment (UE) to the selected at least one first RAN resource; and
  - based on determining that a release condition is satisfied:
    - select at least one second RAN resource among the plurality of RAN resources based on one or more second network condition parameters; and
    - re-assign the UE from the at least one first RAN resource to the selected at least one second RAN resource,
- wherein selecting the at least one first RAN resource comprises:
  - generating a pricing recommendation by analyzing the one or more first network condition parameters to generate a recommended price per unit data for using a RAN resource of the plurality of RAN resources;
  - transmitting the generated pricing recommendation to the at least two different service providers; and
  - selecting the at least one first RAN resource based on one or more responses received from the at least two different service providers.

2. The network node of claim 1, wherein selecting the at least one first RAN resource comprises selecting the at least one first RAN resource based on the bandwidth usage of each of the plurality of RAN resources.

3. The network node of claim 1, wherein obtaining the one or more first network condition parameters includes receiving, from the at least two different service providers, information indicative of at least one of the one or more first network condition parameters.

4. The network node of claim 1,
- wherein selecting the at least one second RAN resource comprises:

transmitting to the UE an instruction configured to instruct the UE to disconnect from the at least one first RAN resource;

obtaining the one or more second network condition parameters of the plurality of RAN resources;

selecting the at least one second RAN resource among the plurality of RAN resources based on the one or more second network condition parameters;

wherein re-assigning the UE from the at least one first RAN resource to the selected at least one second RAN resource comprises:

assigning the UE to the selected at least one second RAN resource; and transmitting, to the UE, a further instruction configured to instruct the UE to connect to the at least one second RAN resource.

5. The network node of claim 4, wherein the release condition includes a first condition that the UE is assigned to the at least one first RAN resource over a predetermined time.

6. The network node of claim 4, wherein the release condition includes a second condition that the UE is determined to be outside of a coverage area of the at least one first RAN resource.

7. The network node of claim 1, wherein generating the pricing recommendation comprises generating the pricing recommendation based on the one or more first network condition parameters and output from a machine-learning network.

8. A method comprising:

obtaining one or more first network condition parameters of a plurality of radio access network (RAN) resources, the plurality of RAN resources being associated with at least two different service providers, wherein the one or more first network condition parameters include at least one of an available bandwidth, a bandwidth usage, a radio indicator, a received signal strength indicator (RSSI), an available capacity, coverage, current time, or price per unit data, and wherein the one or more first network condition parameters are obtained from measurements of the plurality of RAN resources of the at least two different service providers;

selecting at least one first RAN resource among the plurality of RAN resources based on the one or more first network condition parameters;

assigning a user equipment (UE) to the selected at least one first RAN resource; and based on determining that a release condition is satisfied:

selecting at least one second RAN resource among the plurality of RAN resources based on one or more second network condition parameters, and re-assigning the UE from the at least one first RAN resource to the selected at least one second RAN resource, wherein selecting the at least one first RAN resource comprises:

generating a pricing recommendation by analyzing the one or more first network condition parameters to generate a recommended price per unit data for using a RAN resource of the plurality of RAN resources, transmitting the generated pricing recommendation to the at least two different service providers, and selecting the at least one first RAN resource based on one or more responses received from the at least two different service providers.

9. The method of claim 8, wherein selecting the at least one first RAN resource comprises selecting the at least one first RAN resource based on the bandwidth usage of each of the plurality of RAN resources.

10. The method of claim 8, wherein obtaining the one or more first network condition parameters includes receiving, from the at least two different service providers, at least one of the one or more first network condition parameters.

11. The method of claim 8, wherein selecting the at least one second RAN resource comprises:

transmitting to the UE an instruction configured to instruct the UE to disconnect from the at least one first RAN resource;

obtaining the one or more second network condition parameters of the plurality of RAN resources;

selecting the at least one second RAN resource among the plurality of RAN resources based on the one or more second network condition parameters;

wherein re-assigning the UE from the at least one first RAN resource to the selected at least one second RAN resource comprises:

assigning the UE to the selected at least one second RAN resource; and transmitting, to the UE, a further instruction configured to instruct the UE to connect to the at least one second RAN resource.

12. The method of claim 11, wherein the release condition includes a first condition that the UE is assigned to the at least one first RAN resource over a predetermined time.

13. The method of claim 11, wherein the release condition includes a second condition that the UE is determined to be outside of a coverage area of the at least one first RAN resource.

14. The method of claim 8, wherein generating the pricing recommendation comprises generating the pricing recommendation based on the one or more first network condition parameters and output from a machine-learning network.

* * * * *